Sept. 6, 1932.  D. MILLER  1,876,257
HANDLE ASSEMBLY
Filed Jan. 16, 1928
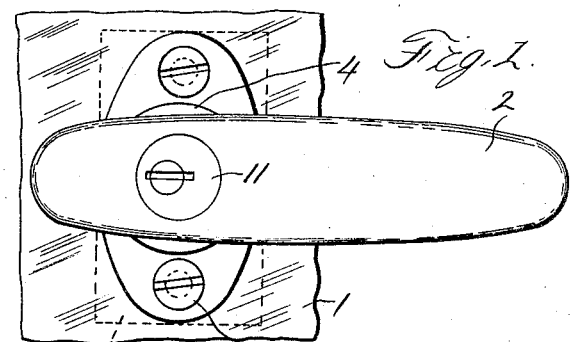
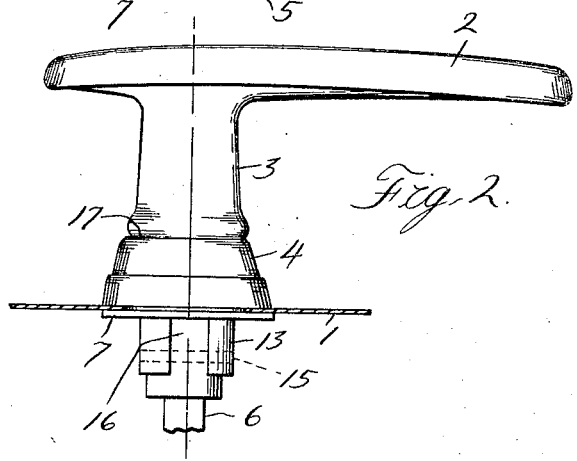
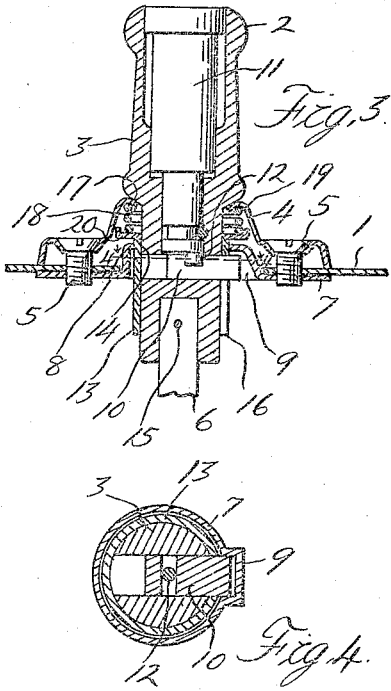
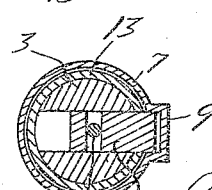
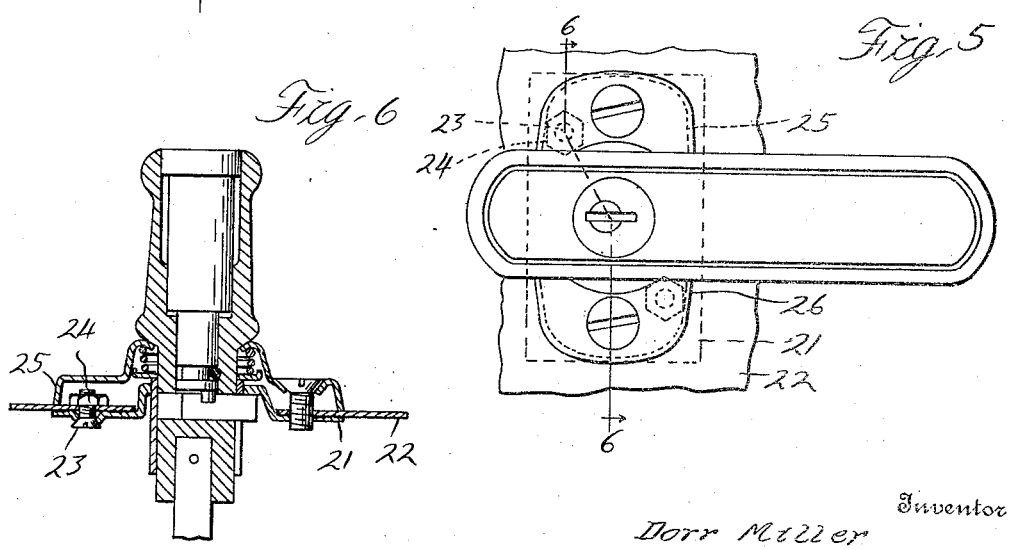
Inventor
Dorr Miller
Attorneys Patented Sept. 6, 1932

1,876,257

UNITED STATES PATENT OFFICE

DORR MILLER, OF DETROIT, MICHIGAN, ASSIGNOR, BY MESNE ASSIGNMENTS, TO THE DURA COMPANY, OF TOLEDO, OHIO, A CORPORATION OF OHIO

HANDLE ASSEMBLY

Application filed January 16, 1928. Serial No. 247,196.

The invention relates to handle assemblies and refers more particularly to outside door handle assemblies. One of the objects of the invention is to so construct the handle assembly that it may be shortened. Another object is to so construct the handle assembly that the means for reinforcing the handle shank also forms a shoulder which is acted upon to hold a shoulder formed upon the shank against the escutcheon. A further object is to so secure the lock plate of the handle assembly that the securing means prevents rotation of the escutcheon to a position uncovering this securing means. With these as well as other objects in view, the invention resides in the novel features of construction and combinations and arrangements of parts as more fully hereinafter set forth.

In the drawing:—

Figure 1 is an end view of a handle assembly embodying my invention;

Figure 2 is a sectional plan view thereof;

Figure 3 is a cross section on the line 3—3 of Figure 2;

Figure 4 is a cross section on the line 4—4 of Figure 3;

Figure 5 is a view similar to Figure 1, showing a modification;

Figure 6 is a cross section on the line 6—6 of Figure 5.

The handle assembly is designed particularly for use at the outer side of a vehicle door to actuate the door latch. 1 is the sheet metal panel forming the support for the handle assembly and 2 is the handle having the shank 3 extending transversely through the panel. 4 is the escutcheon preferably formed of sheet metal and fashioned to be hollow. This escutcheon is suitably secured to the outside of the panel as by means of the screws 5. 6 is the latch actuating spindle extending from the shank 3 and preferably cast thereinto, the handle including the shank being formed of relatively soft material, such as die cast metal, and the spindle being formed of relatively hard material, such as steel. 7 is the lock plate preferably formed of sheet metal and extending at the inside of the panel 1. As shown in Figures 1, 2, 3 and 4, this lock plate is preferably secured to the panel as by spot welding.

To shorten the handle assembly, the lock plate is provided with the boss 8 which extends outwardly through the panel and has the locking recess 9, the boss being apertured for the passage of the handle shank 3. This locking recess is engageable by the locking bolt 10 which is mounted in the shank 3 beyond the spindle 6 and movable transversely of this shank by suitable locking mechanism 11 housed within the shank and adapted to actuate the eccentrically located pin 12 engageable with a slot extending transversely in the locking bolt. The arrangement is such that the locking bolt extends substantially within the confines of the lock plate and but a relatively slight distance inwardly beyond the panel 1. In addition, the handle shank 3 is reinforced so that the spindle 6 need not extend into this shank as far as formerly required. In detail, 13 is a sheet metal sleeve extending longitudinally of the shank and closely engaging the same, this sleeve extending through the boss 8 and its outer end forming a shoulder 14. The sleeve also overlaps the spindle and the sleeve shank and spindle are secured to each other by means of the transverse pin 15 engaging the same. To provide for the passage of the locking bolt 10, the sleeve is preferably slit longitudinally at 16 with this slit of a width to accommodate the width of the locking bolt so that the latter may pass therethrough. For holding the spherical shoulder 17 formed upon the handle shank 3 against the concavo-convex flange 18 upon the escutcheon 4, I have provided the coil spring 19, which is housed within the escutcheon and has its outer end abutting the flange and its inner end abutting the washer 20, which latter rests against the shoulder 14 formed by the reinforcing sleeve. With the above arrangement it will be seen that the handle assembly may be shortened both by bossing the lock plate and by reinforcing the handle shank. It will also be seen that the spindle is more firmly secured in the shank and cannot as easily wear the same as heretofore. Furthermore, that the reinforcing sleeve forms one of the shoulders upon the shank to function in holding the other shoulder in contact with the escutcheon.

In the modification shown in Figures 5 and 6, the same general arrangement of parts is present. However, in this instance, the lock plate 21 is secured to the panel 22 by means of the bolts 23 and nuts 24, which latter are located outside the panel and are housed by the escutcheon 25. The bolts are preferably located at diagonally opposite corners of the lock plate so that the nuts will engage the side flanges 26 of the escutcheon if the screws for securing the escutcheon to the panels are removed and it is attempted to rotate the escutcheon to a position to uncover the nuts. As a result, the handle is held from being pulled out when its locking bolt is in locking position, even when the screws for holding the escutcheon are removed.

What I claim as my invention is:

1. In a handle assembly, the combination with a handle having a shank and a spindle extending from said shank, of a sleeve closely engaging said shank to reinforce the same, and transverse means engaging said sleeve, shank and spindle to secure the same to each other.

2. In a handle assembly, the combination with a handle having a shank formed of relatively soft material and a spindle formed of relatively hard material extending from said shank, of a sleeve formed of relatively hard material closely engaging said shank and reinforcing the same, and a pin extending transversely of and engaging said sleeve, shank and spindle to fixedly secure the same to each other.

3. In a handle assembly, the combination with a handle having a shank formed with a shoulder and an escutcheon, of a sleeve closely engaging said shank to reinforce the same and forming a shoulder spaced from said first mentioned shoulder, and a spring between said escutcheon and the shoulder formed by said sleeve for resiliently holding said first mentioned shoulder against said escutcheon.

4. In a handle assembly, the combination with a handle having a shank formed with a shoulder, a spindle extending into said shank, of a sleeve extending longitudinally of said shank and overlapping said spindle, said sleeve closely engaging said shank to reinforce the same and forming a shoulder spaced from said first mentioned shoulder, and yieldable means between said escutcheon and the shoulder formed by said sleeve for normally holding said first mentioned shoulder in engagement with said escutcheon.

5. In a handle assembly, the combination with a handle having a shank, a locking bolt movable transversely of said shank and a spindle extending from said shank, of a sleeve closely engaging said shank and overlapping said spindle to reinforce said shank, and transverse means engaging said sleeve, shank and spindle to secure the same to each other.

6. In a handle assembly, the combination with a handle having a shank, a locking bolt movable transversely of said shank, and a spindle extending from said shank, of a split sleeve closely engaging said shank and reinforcing the same, the split in said sleeve providing for passage of said locking bolt through said sleeve, and a transverse pin engaging said sleeve, shank and spindle to secure the same to each other.

7. In a handle assembly, the combination with a support, of a locking plate secured to the inner side of said support and having a recessed portion extending outwardly therethrough, a handle carried upon said support, and a transversely movable locking bolt upon said handle engageable with said recessed portion of said lock plate.

8. In a handle assembly, the combination with a support, of a sheet metal lock plate secured to the inner side of said support and having a boss extending outwardly through said support and provided with a locking recess, a handle carried by said support and having a shank extending through said boss, and a locking bolt mounted in said shank and movable transversely thereof into engagement with the locking recess, said bolt being substantially within the confines of said lock plate.

9. The combination with a support, of a lock plate secured to the inner side of said support and having a boss extending outwardly therethrough and provided with a locking recess, a handle carried by said support and having a shank extending through said boss, a spindle extending from said shank, a sleeve closely engaging said shank and overlapping said spindle to reinforce said shank, said sleeve extending outwardly through said boss and forming a shoulder outwardly therebeyond, transverse means engaging said sleeve, shank and spindle for securing the same to each other, and a locking bolt movable transversely of said shank into the locking recess, said locking bolt being substantially within the confines of said lock plate.

10. In a handle assembly, the combination with a support, of a lock plate, a hollow escutcheon, means for securing said escutcheon to said support, and means for securing said lock plate to said support, including threaded members housed by said escutcheon and engageable therewith to prevent rotation thereof to a position uncovering said threaded members.

11. In a handle assembly, the combination with a support, an escutcheon, and means for securing said escutcheon to said support, of a lock plate having a recessed portion extending therefrom, means independent of said escutcheon securing means for securing said lock plate to said support, a handle carried upon said support, and a transversely movable lock bolt upon said handle engageable with the recessed portion of said lock plate.

12. In a handle assembly, the combination with a support, an escutcheon, and means for securing said escutcheon to said support, of a lock plate having an angularly extending boss provided with a lock recess, means independent of said escutcheon securing means for securing said lock plate to said support, said lock plate securing means being housed by said escutcheon and arranged to prevent rotation thereof, a handle carried by said support and having a shank extending through said boss, and a lock bolt mounted in said shank and movable transversely thereof into engagement with the lock recess.

13. In a handle assembly, the combination with a support, of a lock plate, a hollow escutcheon, means for securing said escutcheon to said support and means for securing said lock plate to said support housed by said escutcheon and engageable therewith to prevent rotation thereof to a position uncovering said lock plate securing means.

14. In a handle assembly, the combination with a handle having a shank and a spindle having one end extending into the adjacent end of the shank, of a sleeve closely fitted over the shank in overlapping relation to the end of the spindle extending into the shank for reinforcing the latter, and means for securing the sleeve, shank and spindle to each other.

In testimony whereof I affix my signature.

DORR MILLER.